(12) United States Patent
Botura et al.

(10) Patent No.: US 10,259,589 B2
(45) Date of Patent: Apr. 16, 2019

(54) PULSED DEICING SYSTEM

(71) Applicant: Rohr, Inc., Chula Vista, CA (US)

(72) Inventors: Galdemir Cezar Botura, San Diego, CA (US); Dimitrios Papaioannou, Carmel, IN (US)

(73) Assignee: ROHR, INC., Chula Vista, CA (US)

( * ) Notice: Subject to any disclaimer, the term of this patent is extended or adjusted under 35 U.S.C. 154(b) by 0 days.

(21) Appl. No.: 16/004,087

(22) Filed: Jun. 8, 2018

(65) Prior Publication Data
US 2018/0290758 A1 Oct. 11, 2018

Related U.S. Application Data

(62) Division of application No. 14/861,966, filed on Sep. 22, 2015, now Pat. No. 10,017,262.

(51) Int. Cl.
| | |
|---|---|
| *B64D 15/12* | (2006.01) |
| *B64D 15/00* | (2006.01) |
| *B64D 15/04* | (2006.01) |
| *B64D 15/22* | (2006.01) |
| *F02C 7/047* | (2006.01) |
| *B64D 33/02* | (2006.01) |

(52) U.S. Cl.
CPC .............. *B64D 15/12* (2013.01); *B64D 15/00* (2013.01); *B64D 15/04* (2013.01); *B64D 15/22* (2013.01); *F02C 7/047* (2013.01); *B64D 2033/0233* (2013.01); *F05D 2260/16* (2013.01); *F05D 2270/094* (2013.01)

(58) Field of Classification Search
CPC ........ B64D 15/12; B64D 15/00; B64D 15/04; B64D 15/02; B64D 15/20; H03D 80/40; H02N 1/002
See application file for complete search history.

(56) References Cited

U.S. PATENT DOCUMENTS

| | | | | |
|---|---|---|---|---|
| 3,420,476 A | * | 1/1969 | Schultz .................. | B64D 15/12 244/134 D |
| 3,981,466 A | * | 9/1976 | Shah ...................... | B64D 15/02 244/134 R |
| 4,175,701 A | * | 11/1979 | Wojciehowski .... | F04D 15/0218 239/11 |

(Continued)

FOREIGN PATENT DOCUMENTS

| | | |
|---|---|---|
| EP | 2684800 | 1/2014 |
| JP | 2008208760 | 9/2008 |
| WO | 2008077101 | 6/2008 |

OTHER PUBLICATIONS

Extended European Search Report dated Feb. 17, 2017 in European Application No. 16190108.7.

(Continued)

*Primary Examiner* — Assres H Woldemaryam
(74) *Attorney, Agent, or Firm* — Snell & Wilmer, L.L.P.

(57) ABSTRACT

A deicing system for an aircraft may supply heat to an aircraft component in pulses. A first series of pulses may melt ice built up on the aircraft component. A second series of pulses may prevent ice from forming on the aircraft component. The length of each of the pulses in the first series of pulses may be longer than the length of each of the pulses in the second series of pulses. The pulses may be supplied by a pneumatic deicing system or an electrical deicing system.

4 Claims, 3 Drawing Sheets

(56) References Cited

U.S. PATENT DOCUMENTS

| | | | | |
|---|---|---|---|---|
| 4,613,102 | A * | 9/1986 | Kageorge | B64D 15/166 244/134 A |
| 4,690,353 | A * | 9/1987 | Haslim | B64D 15/163 244/134 D |
| 4,831,819 | A * | 5/1989 | Norris | B64D 15/22 244/134 R |
| 4,852,343 | A | 8/1989 | Norris | |
| 5,074,497 | A * | 12/1991 | Phillips, II | B64D 15/163 244/134 A |
| 5,129,598 | A * | 7/1992 | Adams | B64D 15/163 244/134 A |
| 5,609,314 | A * | 3/1997 | Rauckhorst, III | B64D 15/16 244/134 A |
| 5,657,951 | A * | 8/1997 | Giamati | B64D 15/14 219/121.66 |
| 5,782,435 | A * | 7/1998 | Ingram | B64D 15/163 244/134 A |
| 6,520,452 | B1 * | 2/2003 | Crist | B64D 15/16 244/134 A |
| 7,938,368 | B2 * | 5/2011 | Hogate | F02C 7/047 244/134 A |
| 8,746,622 | B2 | 6/2014 | Gallman et al. | |
| 2003/0052230 | A1 * | 3/2003 | Feher | B64D 15/12 244/134 R |
| 2007/0102582 | A1 | 5/2007 | Botura et al. | |
| 2007/0170312 | A1 * | 7/2007 | Al-Khalil | B64D 15/12 244/134 A |
| 2008/0142638 | A1 | 6/2008 | Chapman et al. | |
| 2010/0059503 | A1 * | 3/2010 | Petrenko | F25C 5/08 219/507 |
| 2013/0199218 | A1 * | 8/2013 | Scheibert | F25D 21/04 62/80 |
| 2014/0191082 | A1 * | 7/2014 | Figueroa-Karlstrom | B64D 15/163 244/134 A |
| 2014/0326712 | A1 | 11/2014 | Hamm | |
| 2015/0034767 | A1 * | 2/2015 | Pirat | B64D 15/04 244/134 B |
| 2015/0129720 | A1 * | 5/2015 | Strobl | B64D 15/163 244/134 D |
| 2015/0291284 | A1 * | 10/2015 | Victor | B64D 15/04 244/134 B |

OTHER PUBLICATIONS

USPTO; Non-Final Office Action dated Mar. 29, 2017 in U.S. Appl. No. 14/861,966.
USPTO; Final Office Action dated Sep. 1, 2017 in U.S. Appl. No. 14/861,966.
USPTO; Advisory Action dated Nov. 7, 2017 in U.S. Appl. No. 14/861,966.
USPTO; Non-Final Office Action dated Dec. 15, 2017 in U.S. Appl. No. 14/861,966.
USPTO; Notice of Allowance dated Apr. 26, 2018 in U.S. Appl. No. 14/861,966.

* cited by examiner

PULSED DEICING SYSTEM

CROSS-REFERENCE TO RELATED APPLICATIONS

This application is a divisional of, and claims priority to, and the benefit of U.S. nonprovisional application Ser. No. 14/861,966, entitled "PULSED DEICING SYSTEM," filed on Sep. 22, 2015. The '966 application is hereby incorporated by reference in its entirety.

FIELD

The present disclosure relates to anti-icing and deicing systems, and more particularly, to anti-icing and deicing systems for aircraft nacelles and other aircraft components and surfaces.

BACKGROUND

Inlets for aircraft nacelles, wing leading edges, horizontal stabilizers, vertical fins, and other aircraft components may be subject to ice build-up during flight. A heat source may heat the components to prevent the ice build-up or to remove ice after it has built up. The heat source most commonly used today is hot bleed air from a gas turbine engine that heats the backside of the external surface subject to ice build-up. Electric resistance heating has also been proposed and is entering service in a small number of applications.

A pressure regulating valve is commonly used to manage the flow rate of bleed air supplied to the deicing system. The pressure regulating valve regulates the pressure of air leaving the valve and flowing toward a cavity formed behind the surface subject to icing. By regulating the outlet pressure, and with constant duct and outlet geometry, the volumetric flow rate of air into the de-icing system is relatively constant. However, the pressure regulating valve does not account for changes in the density and temperature of the bleed air, and changes in the ambient density and temperature. The temperature of the bleed air from the compressor varies based on engine operating conditions. For example, during takeoff, the engine is operating at high throttle, and the bleed air is at a relatively high temperature. Thus, even though the volumetric flow rate is managed, the heat rate and the cooling rate are variable, and therefore the temperature of the heated aircraft surface and associated structure varies widely. The material and design of the heated surface and associated structure must be designed to withstand the possibility of the maximum temperature (which is usually heavy aircraft take-off on a hot, dry ambient day at sea-level, even though this condition may occur infrequently. This condition often drives the design of the heated components, resulting in heavier structures to withstand thermal expansion and/or more expensive materials resistant to the heat.

Although managing the de-icing system by regulating the pressure of the heated air has its advantages, such as simplicity and reliability of the valve components, it may sometimes result in penalties paid due to the heavier and more expensive structures needed to withstand maximum temperatures. It would be advantageous to have more control, or another element of control, over the heating and cooling rate, in order to minimize the maximum temperatures. This extra element of control would be especially beneficial if it can also operate as a backup to the pressure regulating valve when it fails, to help manage the maximum temperatures in that condition.

SUMMARY

A method may comprise supplying heat to an aircraft component during a first pulse, wherein the first pulse is configured to melt ice on the aircraft component. Heat may be supplied to the aircraft component during a second pulse, wherein the second pulse is configured to prevent ice from forming on the aircraft component. A length of time of the first pulse may be greater than a length of time of the second pulse.

In various embodiments, the heat may be supplied by a pneumatic deicing system. a shut off valve may be turned on to supply the first pulse. The length of time of the first pulse may be between 20 and 30 seconds. The length of time of the second pulse may be between 5 and 15 seconds. The heat may be supplied by an electrical deicing system. The length of time of the first pulse and the length of time of the second pulse may be determined by a FADEC. A length of time between the first pulse and the second pulse may be between 20-30 seconds, and a length of time between the second pulse and a third pulse may be between 50-120 seconds.

A method may comprise supplying a plurality of deicing pulses to an aircraft component during a first period. A plurality of anti-icing pulses may be supplied to the aircraft component during a second period. A length of time of each of the plurality of deicing pulses may be greater than a length of time of each of the anti-icing pulses.

In various embodiments, a shut off valve may be toggled between an open position and a closed position to supply the plurality of deicing pulses and the plurality of anti-icing pulses. The plurality of deicing pulses and the plurality of anti-icing pulses may be supplied by an electrical deicing system. The length of time of each of the plurality of deicing pulses may be between 20-30 seconds. The length of time of each of the plurality of anti-icing pulses may be between 5-15 seconds. The aircraft component may be at least one of an inlet for an aircraft nacelle, a wing leading edge, a horizontal stabilizer, or a vertical fin.

A method may comprise impinging engine bleed air on an aircraft component for a first period of time. Engine bleed air may be prevented from impinging on the aircraft component for a second period of time. Engine bleed air may be impinged on the aircraft component for a third period of time. Engine bleed air may be prevented from impinging on the aircraft component for a fourth period of time. Engine bleed air may be impinged on the aircraft component for a fifth period of time. Engine bleed air may be prevented from impinging on the aircraft component for a sixth period of time. The first period of time may be longer than the fifth period of time.

In various embodiments, the second period of time may be shorter than the sixth period of time. Ice on the aircraft component may be melted during the first period of time and the third period of time. Ice may be prevented from forming on the aircraft component during the fifth period of time. The aircraft component may be at least one of an inlet for an aircraft nacelle, a wing leading edge, a horizontal stabilizer, or a vertical fin. The fifth period of time may be shorter than the first period of time and the third period of time, the first period of time and the third period of time may be shorter than the second period of time and the fourth period of time, and the second period of time and the fourth period of time may be shorter than the sixth period of time.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

Figure 1:
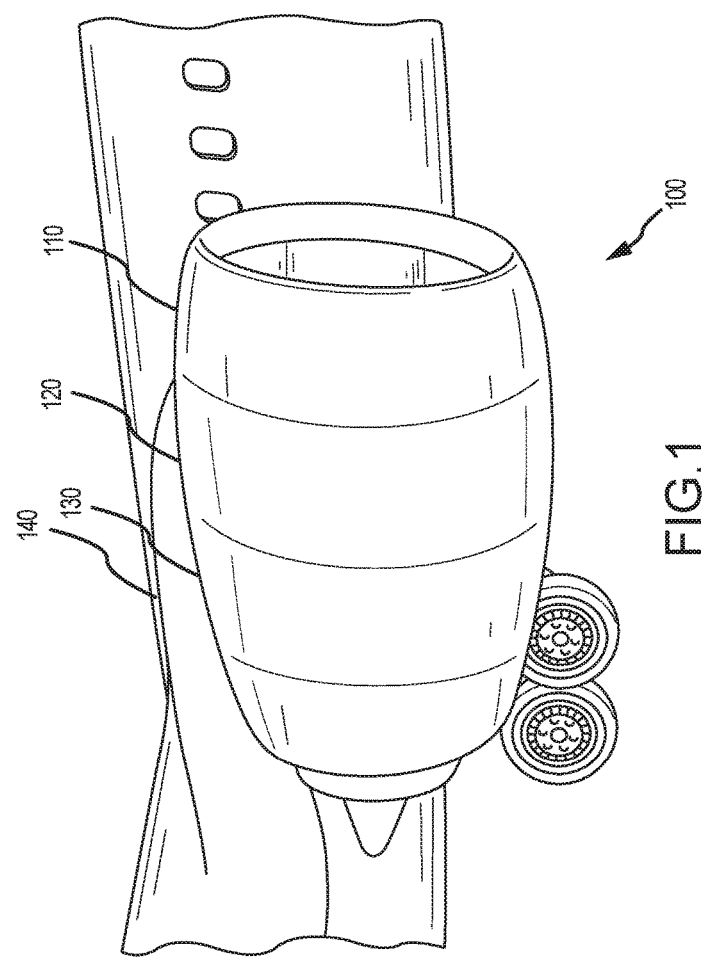
FIG. 1 illustrates a perspective view of a nacelle for an aircraft in accordance with various embodiments.

The detailed description of various embodiments herein makes reference to the accompanying drawings, which show various embodiments by way of illustration. While these various embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials. In some cases, reference coordinates may be specific to each figure.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

Preventing ice build-up is typically referred to as "anti-icing," while removing ice build-up already attached to the aircraft surface is "deicing." A system which provides both anti-icing capability and deicing capability is referred to herein as a deicing system for simplicity.

Engine bleed air may be used to impinge on the backside of aircraft components and heat the external surface to melt ice or prevent ice build-up. A pressure regulating valve may be used to regulate the pressure of the bleed air supply in the deicing system. A solenoid-operated shut off valve may toggle between an open position and a closed position to supply or prevent bleed air from being supplied to an aircraft component. The shut off valve may be pulse-width modulated between its open and closed position to provide an additional element of control of the heat rate of the system and ultimately the temperature of the aircraft component. The pulse-width modulation control may be used in conjunction with the pressure regulating valve, or separately when the pressure regulating valve is in a failed open condition. The pulses may be relatively longer to melt already formed ice when the system is first turned on, and the pulses may be relatively shorter thereafter to prevent ice from forming. The shorter pulses may prevent damage to the aircraft component from spending an excessive amount of time at the high temperature condition, and may extend the life of the component or permit more advantageous component designs to be used. The pulse width may also be controlled based on inputs such as ambient temperature, engine throttle position, detected icing conditions, etc.

Referring to FIG. 1, a nacelle 100 for a gas turbine engine is illustrated according to various embodiments. Nacelle 100 may comprise an inlet 110, a fan cowl 120, and a thrust reverser 130. Nacelle 100 may be coupled to a pylon 140, which may mount the nacelle 100 to an aircraft wing or aircraft body. The nacelle 100 may be disposed about a centerline, which may also be the axis of rotation of an engine located within the nacelle 100. Ice may build up on the inlet 110. A bleed air heater may heat the backside of inlet 110 or other aircraft components in a known manner in order to prevent ice from forming, or to melt ice present on the inlet 110 or on portions of the aircraft wing or aircraft body, as illustrative examples.

Figure 2:
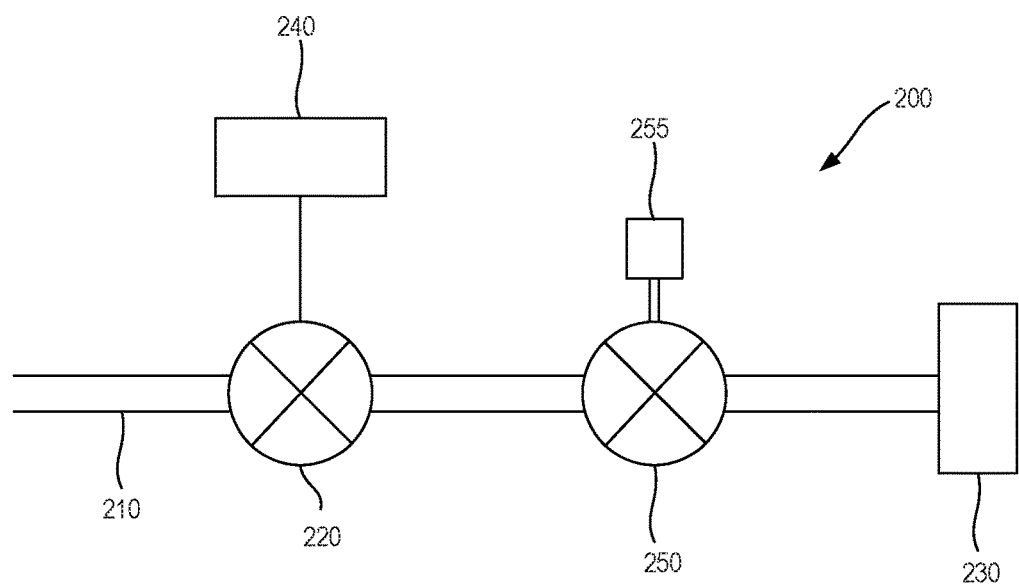
FIG. 2 illustrates a schematic view of a deicing system in accordance with various embodiments of the disclosure.

Referring to FIG. 2, a schematic view of a deicing system 200 is illustrated according to various embodiments. The deicing system 200 may comprise a bleed air supply line 210. The bleed air supply line 210 may receive bleed air from the compressor section of a gas turbine engine located within an aircraft nacelle. The bleed air may be compressed and heated in the compressor section of the gas turbine engine. A pressure regulating valve 220 may manage the mass flow of bleed air supplied to an aircraft component 230 by regulating the output pressure of the valve, in a known manner. The aircraft component 230 may be a component which is subject to icing, such as an inlet for a nacelle or a leading edge of an aircraft wing (e.g. inlet 110 in FIG. 1). The bleed air may heat the backside of aircraft component 230 for deicing.

The bleed air pressure supplied by the engine to the pressure regulating valve 220 may range from 50 pounds per square inch (psi) (340 kPa) at engine idle to 300 psi (2100 kPa) gage pressure at maximum throttle. The pressure regulating valve 220 may regulate its output to 10 psi gage pressure, for example.

In various embodiments, the deicing system may comprise a shut off valve 250 which is in series with the pressure regulating valve 220. The shut off valve 250 might be incorporated into and integrated with the pressure regulating valve 220. The shut off valve 250 may be in positioned in series before or after the pressure regulating valve 250. The shut off valve 250 may be opened or closed to turn on or off the deicing system 200, and it may be turned on and off in pulses for achieving a pulse width modulation control aspect of the system. The shut off valve 250 may comprise an actuator 255, such as a solenoid, to operate the valve.

Below, several possible operating options for the shut off valve are described. Each of these operating embodiments may be used with an operational pressure regulating valve 220, or when the valve 220 has malfunctioned and is operating in a locked open condition.

To create the pulse width modulation effect, bleed air may be supplied to the aircraft component 230 in pulses. The shut off valve is cycled between its open and closed position, spending a controlled amount of time in each position, by controlling the actuator 255. By regulating the "on" time versus the "off" time, the overall flow rate over time is adjusted. While the temperature of the aircraft component 230 may fluctuate within a band between the sets of pulses, the magnitude of the band is controlled, and will be lower than if the shut off valve were in the open position full time.

Figure 3:
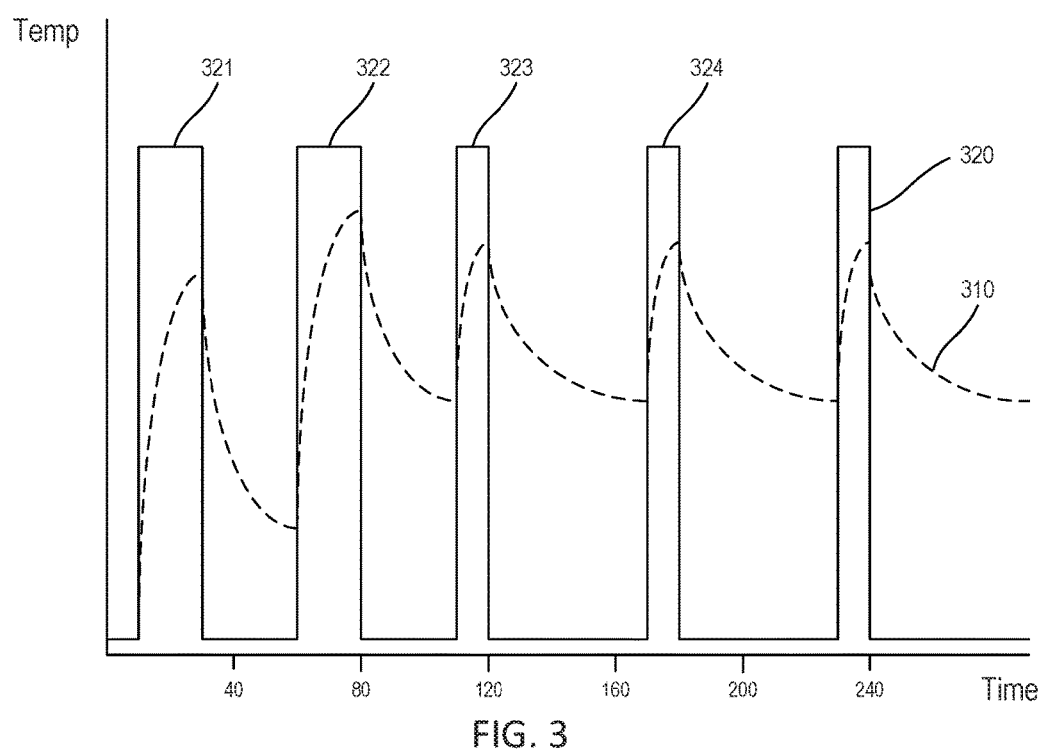
FIG. 3 illustrates a graph of temperature versus time for an aircraft component in accordance with various embodiments of the disclosure.

The length of time of the pulses, or width of the pulses, may be varied, according to various conditions. For example, the pulse width may be adjusted in accordance with the amount of time that has lapsed since the deicing system was activated. As shown in FIG. 3, when the deicing system 200 is initially turned on, the pulse length may be relatively long to provide sufficient thermal energy to melt ice that may already be present on the aircraft component 230. After several initial pulses and after several seconds since the deicing system is activated, the pulse length may be shortened to provide sufficient thermal energy to prevent ice from forming on the aircraft component 230, which is typically less than the energy to melt off ice already formed. Note that the maximum temperature reached during the pulse 32 is less than the maximum temperature reached during subsequent pulses 323, 324, etc. By minimizing the amount of dwell time at the higher temperatures during pulse 322, the life of the aircraft component 230 is improved.

Referring to FIG. 3, a graph of component temperature versus time is illustrated according to various embodiments. Component temperature is illustrated by the dashed line 310. The component temperature may be the temperature of an outer surface of the component. Shut off valve 250 position is illustrated by the solid line 320.

In various embodiments, the component may comprise ice built up on the component at time T=0. The deicing system may be initiated, and one or more long pulses may supply heat to the component. As shown, a first pulse 321 begins at time T=10 and continues for 20 seconds. During the first pulse 321, the component heats up, as illustrated by the dashed line 310. A second pulse 322 begins at time T=60 and continues for 20 seconds. During the 30 seconds between the first pulse 321 and the second pulse 322, the component may decrease in temperature. Once the built-up ice has melted, the system may provide short pulses to prevent ice from subsequently building up. It may take less heat flux to prevent ice from building up than to melt ice, thus shorter pulses may be sufficient to prevent ice build-up without providing a damaging amount of heat to the component.

At time T=110, a third pulse 323 may begin and continue for 10 seconds. At time T=160, a fourth pulse 324 may begin and continue for 10 seconds. The system may continue providing pulses for 10 seconds separated by 50 seconds without supplying heat between pulses. Thus, the system may have a deicing period including the longer pulses 321, 322 to melt already present ice, followed by an anti-icing period including the shorter pulses 323, 324 to prevent ice from building up.

The lengths of the pulses and/or time between pulses may vary based on atmospheric conditions, flight conditions, or aircraft configuration. For example, in various embodiments the pulses during the deicing period may be between 20-30 seconds, between 1-60 seconds, or any other suitable length of time. The time between pulses during the deicing period may be between 20-80 seconds, between 1-120 seconds, or any other suitable length of time. Similarly, the pulses during the anti-icing period may be between 5-15 seconds, between 2-60 seconds, or any other suitable length of time. The time between pulses during the anti-icing period may be between 60-120 seconds, between 2-240 seconds, or any other suitable length of time. In general, the length of the pulses during the deicing period will be longer than the length of the pulses during the anti-icing period, and/or the time between pulses during the deicing period will be shorter than the time between pulses during the anti-icing period. The pulses shown in FIG. 3 depict an exemplary of use of pulse width modulation without pressure control by the pressure regulating valve, for example while the pressure regulating valve is not functioning and locked open. But, conceivably they could also be exemplary of pulses used in conjunction with a functioning shut off valve 250.

A FADEC or other electronic controller may monitor engine and atmospheric conditions and command the system to provide pulses of varying lengths based on the conditions. The FADEC may automatically vary the pulse length without input from a pilot. In various embodiments, the deicing system may be initiated during conditions where there is no ice build-up, or where there is unlikely to be ice build-up. In such conditions, the deicing period of long pulses may not be desirable, and the system may start with shorter anti-icing pulses. For example, during on-ground conditions or during dry air flight conditions, the system may forgo the longer deicing pulses to prevent excess heat from damaging the components. Pulse width and/or frequency may vary in response to atmospheric conditions, such as temperature that may influence the rate of ice formation on an aircraft. Pulse width and/or frequency may also vary in response to engine throttle position, as the bleed air at various speeds may have varying temperature, with greater temperatures using shorter pulses to improve component life. Similarly, pulse width and/or frequency may be varied in response to the weight on the landing gear, as an aircraft on the ground may be subjected to different deicing temperatures and frequencies compared to an aircraft in flight.

If the pulse-width modulated shut off valve is used in series with the pressure compensating valve, its positive impact may be greatest during the condition when the pressure regulating valve is failed and locked open. This condition may typically be used when the pressure regulating valve is detected in a malfunction state. In order to ensure the safety of the aircraft and at the same time provide for continued operation, the pressure regulating valve may be manually opened and locked to its fully opened position, providing full-time deicing, as is known to those of skill in this art. In such a condition, the shut off valve 250 may be modulated in order to reduce the maximum temperature that the aircraft component 230 will reach. In some designs today, a second pressure regulating valve might be used in series with the valve 220 to provide for redundancy. A simpler solenoid-operated shut off valve is preferable.

In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. Furthermore, the connecting lines shown in the various figures contained herein are intended to represent various functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A method comprising:
   impinging engine bleed air on an aircraft component for a first period of time;
   preventing engine bleed air from impinging on the aircraft component for a second period of time;
   impinging engine bleed air on the aircraft component for a third period of time;
   preventing engine bleed air from impinging on the aircraft component for a fourth period of time;
   Impinging engine bleed air on the aircraft component for a fifth period of time;
   preventing engine bleed air from impinging on the aircraft component for a sixth period of time,
   wherein the first period of time is longer than the fifth period of time;
   wherein the engine bleed air is supplied through a pressure regulating valve and a full authority digital engine control system detects that the pressure regulating valve is in a locked open position in response to a pressure regulating valve outlet pressure being higher than a threshold value.

2. The method of claim 1, further comprising melting ice on the aircraft component during the first period of time and the third period of time.

3. The method of claim 1, further comprising preventing ice from forming on the aircraft component during the fifth period of time.

4. The method of claim 1, wherein the aircraft component is at least one of an inlet or an aircraft nacelle, a wing leading edge, a horizontal stabilizer, or a vertical fin.

* * * * *